(No Model.) 2 Sheets—Sheet 2.
A. F. NAGLE.
STEAM TRAP.
No. 522,668. Patented July 10, 1894.
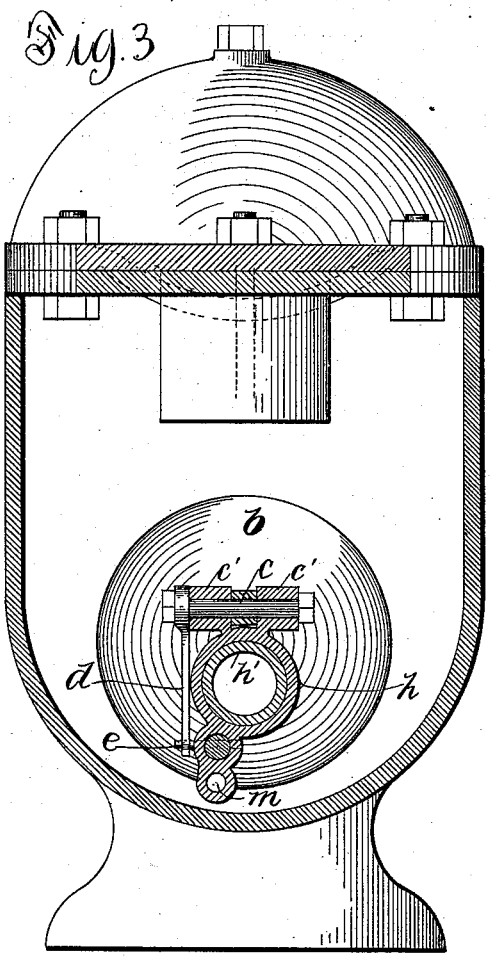
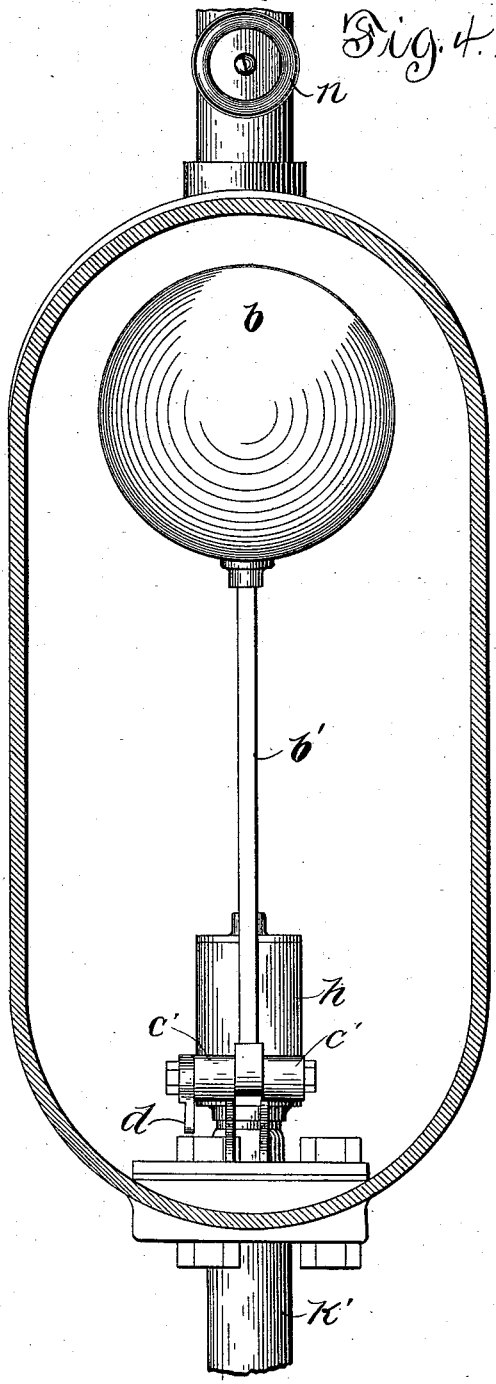
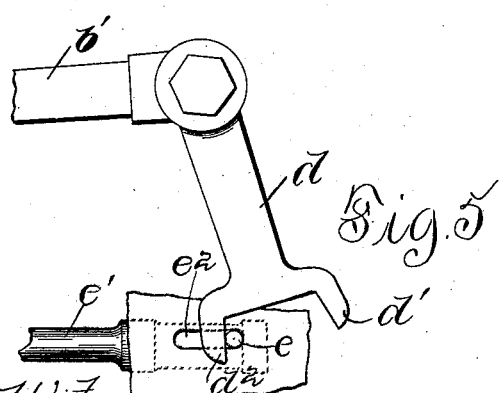
Witnesses:
George L. Cragg
George S. Buell
Inventor:
Augustus F. Nagle
By Barton & Brown
Attorneys.

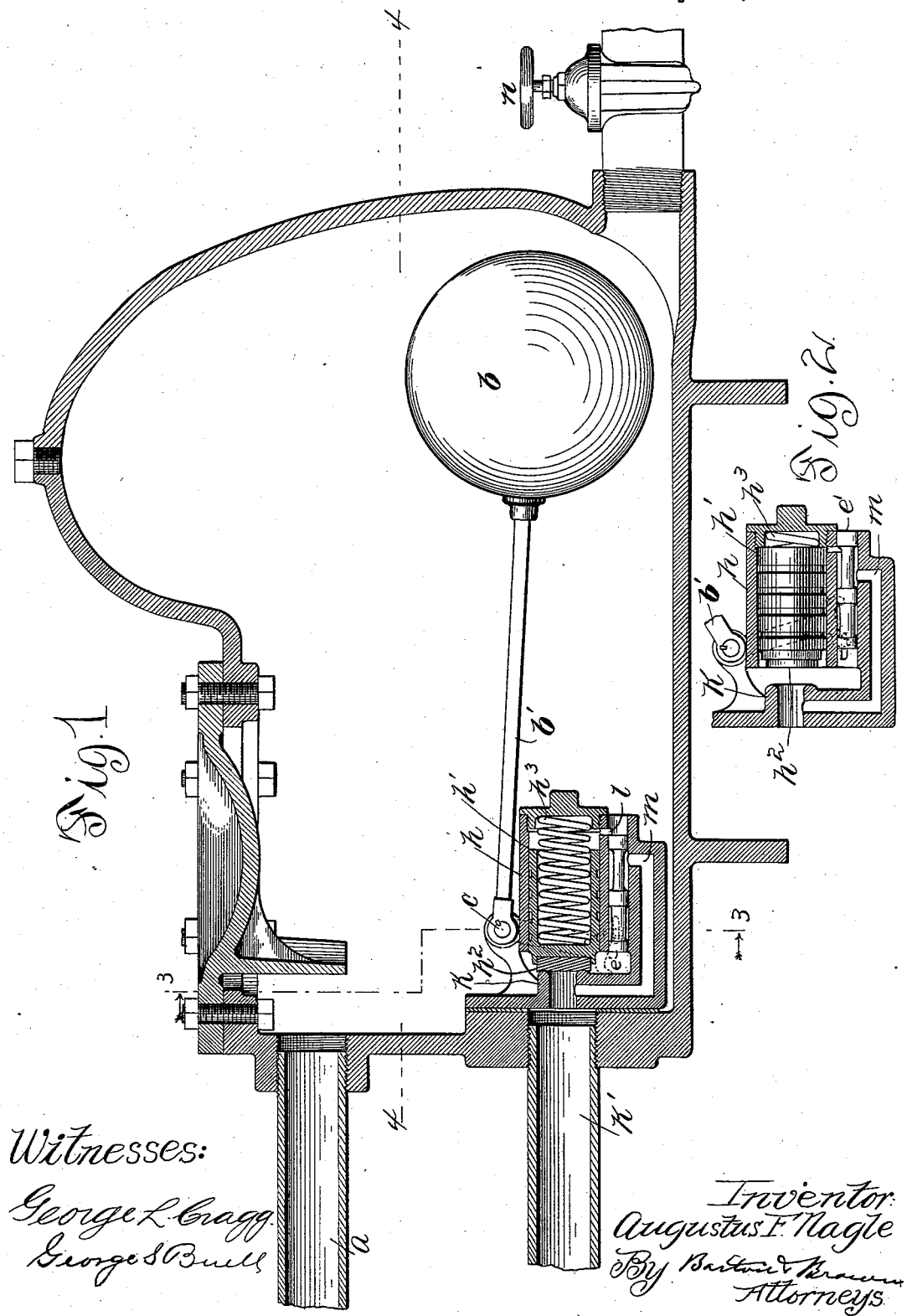

UNITED STATES PATENT OFFICE.

AUGUSTUS F. NAGLE, OF CHICAGO, ILLINOIS.

STEAM-TRAP.

SPECIFICATION forming part of Letters Patent No. 522,668, dated July 10, 1894.

Application filed April 4, 1894. Serial No. 506,278. (No model.)

*To all whom it may concern:*

Be it known that I, AUGUSTUS F. NAGLE, a citizen of the United States, residing at Chicago, in the county of Cook and State of Illinois, have invented a certain new and useful Improvement in Steam-Traps, of which the following is a full, clear, concise, and exact description, reference being had to the accompanying drawings, forming a part of this specification.

My invention relates to steam traps, and its object is to provide a trap in which the discharge valve will at the proper time be quickly and fully opened to permit the escape of the entrapped water, and likewise quickly closed when the water level has fallen in the required degree.

Heretofore it has been proposed to provide a discharge valve positively connected with a float within the trap, the elevation of the float with the rise in water level serving to open the valve when the water reaches a predetermined height and to maintain the valve open until the water level falls below such height. The objection to this construction is that when the water level is but slightly above that at which the valve begins to open, the valve is but slightly opened, and the rapid outrush of water due to the high steam pressure within the trap rapidly wears away the valve seat. My invention contemplates the overcoming of this difficulty by the provision of means wherein the valve is not positively connected with the float; the float instead serving to throw into action independent means for quickly opening the valve to its full extent so long as the water level remains above the predetermined point, and then quickly closing the same when the water level falls below such point.

My invention will be understood by reference to the accompanying drawings, in which—

Figure 1 is a sectional view in elevation of a steam trap embodying my invention. Fig. 2 is a detached sectional view showing the discharge valve open. Fig. 3 is a transverse sectional view on line 3—3, Fig. 1. Fig. 4 is a longitudinal sectional view on line 4—4, Fig. 1. Fig. 5 is a detached view of the steam valve and its operating arm as seen from the rear of Fig. 1.

Like letters refer to like parts in the several figures.

The water of condensation enters the trap by the inlet pipe $a$. Within the trap is a float $b$ mounted upon the end of a lever $b'$ keyed to a shaft $c$, the shaft being journaled in supports $c'$. Keyed to said shaft $c$ is an arm $d$, provided with a bifurcated end, the members thereof being adapted, as the float rises and falls thus rocking the arm $d$, to alternately engage the pin $e$ which is provided on the piston valve $e'$, a slot $e^2$ being provided in the side of the valve cylinder for the travel of said pin.

The ends of the valve cylinder are open, thus exposing the opposite ends of the valve to the pressure within the trap, the valve being in this manner perfectly balanced and the only force required to move the same being that necessary to overcome the slight resistance of friction.

Above the valve $e'$ is provided a cylinder $h$ within which moves a piston $h'$, the piston being provided upon its end with an elastic packing $h^2$ which normally rests against the rounded edge of the discharge outlet $k$ to maintain the discharge outlet sealed against the outflow of the water. Between the piston $h'$ and the cylinder head is provided a coiled spring $h^3$ which serves to return the piston $h'$ to its normal position, as will be hereinafter described. The cylinder $h$ at the rear of the piston $h'$ communicates with the steam trap by means of a port $l$. The several parts occupying the relative positions shown in Fig. 1, both sides of piston $h'$ are subjected to the pressure within the steam trap and the piston is pressed against the valve seat of the discharge outlet with considerable force as the area exposed at the rear of the piston is greater than that exposed at the forward end.

As the water level rises, the float $a$ is raised until the member $d'$ of arm $d$ engages the pin $e$; as the float continues to rise the pin is moved to the right, thus causing the valve $e'$ to occupy a position as shown in Fig. 2, in which the port $l$ is cut off from communication with the trap and thrown into communication with the exhaust passage $m$ leading to the discharge pipe $k'$. The water behind the piston $h$ is thus permitted to escape, the pressure behind the piston falling to that of the atmosphere, and the pressure upon the front of the piston which is subjected to the high pressure within the trap, causes the piston $h'$ to quickly move to the right until it rests against the cylinder head, the discharge outlet being thus suddenly and completely opened to permit the outflow of the water within the trap. The outlet thus remains completely opened until the level of the water falls to the predetermined level, when the member $d^2$ of arm $d$ coming in contact with pin $e$ moves valve $e'$ to the left again, throwing port $l$ into communication with the steam trap. The front and rear ends of the piston $h'$ are now subjected to the pressure within the steam trap, and being of the same area the piston is balanced.

To return the piston to its normal position to close the discharge outlet, the spring $h^3$ is provided, which now acts to return the piston to its former position with the elastic packing $h^2$ resting against the edge of the discharge outlet. As the piston thus comes in contact with the edge of the discharge outlet, the portion of the area within the line of contact of block $h^2$ with said edge, is subjected to the pressure of the atmosphere, and the predominating pressure upon the rear of the piston forces the same tightly against the discharge outlet. As the water level again rises above the predetermined point, the operation is repeated.

A valve $n$ is provided at the bottom of the steam trap which may be opened to permit the passage of steam through the trap to remove any sediment that may have collected in the bottom thereof.

It is evident that my invention is susceptible of modifications, and I do not, therefore, desire to limit myself to precise details, but Having described my invention, what I claim as new, and desire to secure by Letters Patent, is—

1. In a steam trap, the combination with the piston $h'$ resting against the edge of the discharge outlet, of the port $l$ through the agency of which the rear end of said piston is subjected to the pressure within the trap, the balanced valve $e'$ adapted to throw said port into communication with the exhaust passage $m$ to effect the movement of piston $h'$ to unseal the discharge outlet, the float $a$, and the bifurcated arm $d$ actuated thereby, the pin $e$ adapted to be alternately engaged by the members $d'$ $d^2$ of said arm $d$ to move said valve, and the spring $h^3$ adapted to return the piston $h'$ to its normal sealing position, substantially as described.

2. In a steam trap, the combination with a valve adapted to seal the discharge outlet of a piston connected therewith, one face thereof being continuously subjected to the pressure within the trap, an inlet port, through the agency of which the opposite face of said piston communicates with the trap, an exhaust port, by means of which said opposite face of the piston may communicate with the atmosphere, an auxiliary valve for closing said inlet port and opening said exhaust port, and a float for actuating said auxiliary valve, substantially as described.

3. In a steam trap, the combination with a valve adapted to seal the discharge outlet, of a piston for actuating said valve, both sides of said piston being normally subjected to the pressure within the trap, an auxiliary valve for cutting off the communication between one side of said piston and the trap and throwing the said side into communication with the atmosphere, and a float for actuating said valve, substantially as described.

In witness whereof I hereunto subscribe my name this 30th day of March, A. D. 1894.

AUGUSTUS F. NAGLE.

Witnesses:
W. CLYDE JONES,
GEORGE L. CRAGG.